(12) United States Patent
Zhu et al.

(10) Patent No.: US 8,691,913 B2
(45) Date of Patent: Apr. 8, 2014

(54) POLYLACTIC ACID COMPOSITIONS, POLYLACTIC ACID MATERIALS AND METHODS OF PREPARING THE SAME

(75) Inventors: Xueyuan Zhu, Shenzhen (CN); Jianghong Dou, Shenzhen (CN); Xiaobin He, Shenzhen (CN); Jianghui Li, Shenzhen (CN)

(73) Assignee: BYD Company Limited (CN)

( * ) Notice: Subject to any disclaimer, the term of this patent is extended or adjusted under 35 U.S.C. 154(b) by 0 days.

(21) Appl. No.: 13/432,858

(22) Filed: Mar. 28, 2012

(65) Prior Publication Data
US 2012/0252977 A1   Oct. 4, 2012

(30) Foreign Application Priority Data

Mar. 30, 2011   (CN) .......................... 2011 1 0078584

(51) Int. Cl.
   *C08L 67/04*   (2006.01)
   *C08L 9/06*    (2006.01)
   *B29B 9/06*    (2006.01)
   *C08L 51/00*   (2006.01)
   *C08L 55/02*   (2006.01)

(52) U.S. Cl.
   USPC ............................................ 525/65; 525/66

(58) Field of Classification Search
   USPC ........................................................ 525/66
   See application file for complete search history.

(56) References Cited

U.S. PATENT DOCUMENTS

| 4,720,424 | A  | * | 1/1988 | Eickman et al. ............... 428/323 |
| 2009/0209695 | A1 | * | 8/2009 | Yu et al. ........................ 524/451 |
| 2009/0209697 | A1 | * | 8/2009 | Persigehl et al. ............. 524/502 |
| 2011/0071247 | A1 | * | 3/2011 | Ishii et al. ..................... 524/504 |
| 2012/0128896 | A1 | * | 5/2012 | Tucker et al. ................. 427/579 |

OTHER PUBLICATIONS

Xu et al., CAPLUS AN 2011:568526 May 2011.*

* cited by examiner

*Primary Examiner* — Jeffrey Mullis
(74) *Attorney, Agent, or Firm* — Greenberg Traurig, LLP

(57) ABSTRACT

A polylactic acid composition is provided having a polymer matrix and a compatibilizer. The polymer matrix includes polylactic acids and acrylonitrile-butadiene-styrene[s]. The compatibilizer is at least one compound selected from the group consisting of: a poly (styrene-ethylene-butadiene-styrene) copolymer grafted with maleic anhydrides, an acrylonitrile-butadiene-styrene copolymer grafted with maleic anhydrides, a polystyrene grafted with maleic anhydrides, and an ethylene-ethyl acrylate-glycidyl methacrylate.

9 Claims, No Drawings

POLYLACTIC ACID COMPOSITIONS, POLYLACTIC ACID MATERIALS AND METHODS OF PREPARING THE SAME

CROSS-REFERENCE TO RELATED APPLICATION

This application claims priority to and the benefit of prior Chinese Patent Application No. 201110078584.0, which was filed with State Intellectual Property Office on Mar. 30, 2011, and the entire content of which is incorporated herein by reference.

FIELD

The present disclosure relates to a polylactic acid composition. More particularly, the present disclosure relates to polylactic acid compositions and methods of preparing the same.

BACKGROUND

Lactic acids have been prepared from starchy agricultural products such as rice, potatoes, corns, and rice bran. In prior illustrative methods, these agricultural products have been subjected to the following steps to produce lactic acids: gelatinization, saccharification, inoculation, fermentation, precipitation, crystallization, acidolysis, concentration, etc.

Without wishing to be bound by the theory, Applicant believes that fermentation was an important step in the formation process. During the fermentation step, germ has been added to the agricultural products subjected to gelatinization and saccharification, in order to prepare polylactic acids. The process to prepare lactic acids, however, is a reversible process, which tends to retard, or stop, the fermentation process. In order to improve production, calcium carbonates ($CaCO_3$) may have been added to the fermentation solution to react with the lactic acids and produce calcium lactate. In this manner, the amount of lactic acid produced in the fermentation solution was decreased and the fermentation process may proceed. After completion of the fermentation process, sulfuric acids may have been added to the calcium lactate in order to release the lactic acids by acidolysis.

The lactic acids may have been polymerized to form polylactic acid ("PLA"). PLA may be degraded by natural microorganisms, which may release carbon dioxide and water. The degradation may be generally "environmentally friendly," and PLA may have had fairly good biocompatibility and biodegradability.

SUMMARY

In accordance with various illustrative embodiments, hereinafter disclosed are polylactic acid compositions. The polylactic acid composition may comprise a polymer matrix and a compatibilizer. The polymer matrix may be formed by, or otherwise include, polylactic acids and acrylonitrile-butadiene-styrene[s]. The compatibilizer may be at least one compound selected from the group consisting of: a poly (styrene-ethylene-butadiene-styrene) copolymer grafted with maleic anhydrides, an acrylonitrile-butadiene-styrene grafted with maleic anhydrides, a styrene grafted with maleic anhydrides, and an ethylene-ethyl acrylate-glycidyl methacrylate.

In accordance with another illustrative embodiment, hereinafter disclosed are polylactic acid materials. The polylactic acid materials may be formed by the polylactic acid compositions described above.

In accordance with a still further illustrative embodiment, hereinafter disclosed are methods of preparing the polylactic acid material. The methods may comprise the steps of: melting and extruding the polylactic acid composition at a temperature ranging from about 140° C. to about 200° C. to form an extruded polylactic acid composition, and then granulating and injection molding the extruded polylactic acid composition to form the polylactic acid material.

Without wishing to be bound by the theory Applicant believes that the cooperation of polylactic acid, acrylonitrile-butidiene-styrene (ABS) copolymer, and at least one compatibilizer may improve the mechanical performances (and optionally the thermal resistance and the biodegradability) of the resulting polylactic acid composition.

While the compositions and methods thereof will be described in connection with various preferred illustrative embodiments, it will be understood that it is not intended to limit the composition and the methods to those embodiments. On the contrary, it is intended to cover all alternatives, modifications, equivalents as may be included within the spirit and scope of the invention(s) as defined by the appended claims.

DETAILED DESCRIPTION OF THE EMBODIMENT

Reference will be made in detail to embodiments of the present disclosure. The embodiments herein are explanatory and illustrative, which are used to generally understand the present disclosure. The embodiments shall not be construed to limit the present disclosure.

In an embodiment, polylactic acid compositions are disclosed herein. The polylactic acid composition may comprise a polymer matrix and a compatibilizer. The polymer matrix may comprise at least one polylactic acid and at least one acrylonitrile-butadiene-styrene. The compatibilizer may comprise at least one compound selected from the group consisting of: a poly (styrene-ethylene-butadiene-styrene) copolymer grafted with maleic anhydrides, an acrylonitile-butadiene-styrene grafted with maleic anhydrides, a styrene grafted with maleic anhydrides, and an ethylene-ethyl acrylate-glycidyl methacrylate.

In an embodiment, the amount of acrylonitrile-butadiene-styrene utilized may range from about 91 weight percent ("wt. %") to about 171 wt. % of the polylactic acid, and the amount of compatibilizer may range from about 10 wt. % to about 22.2 wt % of the polylactic acid, based on the total weight of the polylactic acids.

In various embodiments, the polylactic acids may be polyester materials made from organic polylactic acids. For example and without limitation, the polylactic acids may have properties suitable for use in biodegradation, mechanical and physic applications, and may compatible with other materials.

In an embodiment, the polylactic acids may have a viscometric average molecular weight ranging from about 100,000 to about 750,000, a melting temperature ranging from about 150° C. to about 175° C. Alternatively, the polylactic acids may have a viscometic average molecular weight ranging from about 150,000 to about 500,000, and a melting temperature ranging from about 160° C. to about 170° C. Suitable polylactic acids may include, without limitation, commercially available products such as 3051D polylactic acids provided by Natureworks, American, which has a viscometic average molecular weight of about 180,000 and a melting temperature of about 165° C.

Without wishing to be bound by the theory Applicant believes that moisture in the polylactic acid raw materials may influence the appearance and mechanical performance of the final product. Accordingly, in various embodiments, the polylactic acid(s) may each have a moisture content of less than about 0.025 wt. %, alternatively less than about 0.015 wt. %.

The polylactic acid raw materials may be provided with a determined, or known, moisture content. Preferably, the polylactic acid raw material may be subjected to a pretreatment. In an embodiment, the pretreatment may comprise: drying the polylactic acid raw material under a pressure ranging from about 0.04 MPa to about 0.08 MPa, at an environmental temperature (i.e., an oven temperature) ranging from about 90° C. to about 95° C., for a time period ranging from about 4 hours to about 8 hours.

In an embodiment, the polylactic acid raw materials subjected to pretreatment may be tested by a Carl Fischer Moisture Tester (MKC-520+ADP-511S commercially available from METTLER TOLEDO, to determine the moisture content using Karl Fischer Coulometric Titrimetry and Karl Fischer volumetric titrimetry according to ASTM D6869-03.

In various embodiments, the polylactic acid raw materials may comprise ABS. In an embodiment, the ABS may be compolymerized by acrylonitrilles, butadienes, and styrenes. Suitable methods for compolymerization of acrylonitrilles, butadienes, and styrenes are generally known to those skilled in the art. In another embodiment, the ABS may be commercially available. In an embodiment, the ABS may have a weight average molecular weight ranging from about 50,000 to about 150,000, and alternatively ranging from about 80,000 to about 120,000.

In an embodiment, the compatibilizer may be a poly (styrene-ethylene-butadiene-styrene) copolymer grafted with maleic anhydrides (SEBS-g-MAH). For example, suitable SEBS-g-MAH may be obtained from Kraton Polymers, US, and Sunny New Technology and Development Co, Ltd, located in Shanghai, China. In an embodiment, the maleic anhydrides in the SEBS-g-MAH may have a weight percent ranging from about 3 wt. % to about 10 wt. %, alternatively from about 5 wt. % to about 8 wt. %, based on the total weight of the SEBS-g-MAH. Without wishing to be bound by the theory, Applicant believes that when the maleic anhydrides are present in such ranges within the SEBS-g-MAH, the themal resistance performances of the polylactic acid composition are generally improved.

In some embodiments, the SEBS-g-MAH, the polystyrene grafted with maleic anhydrides (SMA), the ethylene-ethyl acrylate-glycidyl methacrylate (EMA-GMA) may be commercially available. In an embodiment, the weight percent of the maleic anhydrides in the SEBS-g-MAH may range from about 3 wt. % to about 10 wt. %, alternatively from about 5 wt. % to about 8 wt. %. In an embodiment, the weight percent of the maleic anhydrides in the SMA range from about 3 wt. % to about 10 wt. %, alternatively from about 5 wt. % to about 9 wt. %.

Without wishing to be bound by the theory, Applicant believes that the application of EMA-GMA as the compatibilizer may improve the compatibility between the polylactic acids and the ABS copolymer, and at the same time improve the mechanical performances of the polylactic acid composition. Furthermore, Applicant believes, without wishing to be bound by the theory that using EMA-GMA as the compatibilizer may generally improve both thermal resistance and shock resistance performances of the polylactic acid composition. In an embodiment, the weight percent of ethyl acrylate-glycidyl methacrylate in the EMA-GMA may range from about 6 wt. % to about 15 wt. %, and alternatively range from about 7 wt. % to about 14 wt. %.

The polylactic acid composition may comprise at least one additive selected from the group consisting of: an antioxidant, a hydrolysis resistance agent, and a shock resistance agent, which may—without wishing to be bound by the theory— improve the intergrativity of the polylactic acid composition.

The antioxidant may be any suitable antioxidant known in the art. Preferably, the antioxidant may be at least one selected from the group consisting of: a butyl hydroxy anisd, a dibutyl hydroxyl toluene, a tert-butylhydroquinone, a phenyl diisodecyl phosphate, a pentaerythritol diphosphite, [3-(3,5-dit-butyl-4-hydroxyphenyl)propionic acid]pentaerythriotol, a tri-(2,4-dit-butyl phenyl)phosphate, [β-(3,5-dit-butyl-4-hydroxy phenyl)propionic acid]octadecanoate, tetra[β-(3,5-dit-butyl-4-hydroxy phenyl)propionic acid]pentaerythriotol. In an embodiment, based on the total weight of the polylactic acids, the weight percent of the antioxidant may range from about 0.3 wt. % to about 2 wt. %. In an embodiment, the antioxidant may be commercially available, such as an antioxidant 1010 provided by Nanjing Hua Lim Co., Ltd, located in China. Suitable hydrolysis resistance agents are generally known to those skilled in the art.

In an embodiment, the hydrolysis resistance agent may be at least one selected from the group consisting of: a carbodiimide compound, an isocyanate compound, and an oxazoline compound. In an embodiment, the hydrolysis resistance agent may be present in an amount ranging from about 0.2 wt. % to about 1.68 wt. %, based on the weight of the polylactic acids.

In an embodiment, the shock resistance agent may be at least one selected from the group consisting of: a silicon-acrylic resin, and a methyl methacrylate-ethyl acrylate-butyl acrylate copolymer. The shock resistance agent may be present in an amount ranging from about 6.8 wt. % to about 50 wt. % of the weight of the polylactic acids. The shock resistance agent may be a commercially available product, for example an s-2001 shock resistance agent commercially available from Mitsubishi Chemical Holdings Corporation. Without wishing to be bound by the theory, the addition of shock resistance agent may improve the shock resistance performance of the composition.

According to another aspect of the present disclosure, a polylactic acid material is provided. The polylactic acid material may be made from the polylactic acid composition disclosed herein.

According to a further aspect of the present disclosure, a method of preparing the polylactic acid material is provided herein. The method may comprise the steps of: melting and extruding a raw material mixture at an environmental temperature ranging from about 140° C. to about 200° C. to form an extruded polylactic acid composition, and then granulating and injection molding the extruded polylactic acid composition to form the polylactic acid material In an embodiment, raw material may be mixed in a high-speed mixer at a temperature ranging from about 50° C. to about 70° C., for a time period ranging from about 2 minutes to about 8 minutes. Suitable high-speed mixers are generally known in the art, and include a SHR-5A high-speed mixer available from Hongji Mechanical Co., Ltd, located in Zhangjiagang, China.

During the preparing process of polylactic acid materials, applicant believes without wishing to be bound be the theory that the existence of moisture may influence the performance of the polylactic acid material. Therefore, in a preferred embodiment, the raw materials for preparing the polylactic acid material may be dried under a pressure ranging from about 0.04 MPa to about 0.08 MPa, at a temperature ranging from about 30° C. to about 95° C., for a time period ranging from about 4 hours to about 8 hours to remove substantially all moisture therefrom. Then, the raw materials may be melted and extruded in an extruder. Suitable extrusion methods are generally known to those skilled in the art. For example, a ratio of screw length and screw diameter of the extruder may be in a range of from about 20 to about 40, a screw rotation speed may range from about 180 revolution per minute ("r/min") to about 230 r/min, the temperature region(s) of the extruder may be selected from the group consisting of: about 140° C. to about 160° C., about 140° C. to about 170° C., about 140° C. to about 180° C., about 150° C. to about 180° C., about 160° C. to about 180° C., about 170° C. to about 190° C., about 180° C. to about 195° C., about 180° C. to about 195° C., about 190° C. to about 200° C., about 195° C. to about 200° C., and the vacuum degree for each temperature region may range from about 0.02 MPa to about 0.06 MPa.

The vacuum degree may refer to an absolute pressure. The extrusion process may be performed in a double screw extruder in order to obtain the extruded product. Suitable double screw extruders are generally known to those skilled in the art, and include for example a TSSJ25 double screw extruder commercially available from Chenguangkeqiang Company.

In an embodiment, the extruded products may be granulated and injection molded to prepare the polylactic acid material. Suitable methods of granulation and injection molding are both generally known in the art. In an embodiment, the extruded products may be cooled in a water groove, and then granulated in a granulator (using for example a QLJ-1 granulator from ZHANGJIAGANG LIANDA MACHINERY CO., LTD.) at a rotation speed ranging from about 300 r/min to about 450 r/min, and finally dried and injection molded.

The polylactic acid material prepared by the above-mentioned methods may have generally good mechanical performances and generally good thermal resistance performances. In embodiments utilizing shock resistance and hydrolysis resistance agent(s), shock resistance performances and hydrolysis resistance performances of the polylactic acid material may generally be further improved.

The present disclosure may be further explained by the following examples:

EXAMPLE 1

1. Pretreatment of Raw Material

Polylactic acids (provided by Natureworks Corporation, located in the US, having a viscosity average molecular weight of 200,000 and a melting temperature of 165° C.) and ABS (type ABS PA-747 provided by Qimei Corporation, located in Taiwan, having a weight average molecular weight of about 70,000) were dried in a drying oven under a pressure of 0.08 MPa, at an oven temperature of 90° C., for a time period of 4 hours ("h").

Polystyrene grafted with maleic anhydrides (type 1501 provided by Sunny Corporation, located in Shanghai, China, and maleic anhydrides having a weight content of 6 wt %) was placed in a vacuum drying oven, and dried under a pressure of 0.06 MPa, at a temperature of 70° C., for a time period of 4 h.

2. Mixing and Extrusion 100 weight parts of the polylactic acids (with a moisture content of 0.02 wt. %), 100 weight parts of ABS, and 12 weight parts of polystyrene grafted with maleic anhydrides were placed in a double screw extruder and mixed under the following conditions: a ratio of a screw length to screw diameter of 25, a screw rotation speed of 200 r/min, a vacuum degree of 0.02 MPa, and the extruder having ten temperature regions was set (from the inlet to the outlet) as follows: 140° C., 150° C., 150° C., 155° C., 170° C., 175° C., 180° C., 190° C., 195° C., and 200° C.

3. Staying, Granulating and Injection Molding

The extruded product was stayed by cooling in a water groove, and granulated in a granulator (type QLJ-1 commercially available from ZHANGJIAGANG LIANDA MACHINERY CO., LTD, location in China) at a rotation speed of 300 r/min, then dried and injection molded to form the polylactic acid material. The resulting polylactic acid material was labeled "A1."

EXAMPLE 2

1. Pretreatment of Raw Material

Polylactic acids (provided by Natureworks Corporation, located in the US, having a viscosity average molecular weight of 250,000 and a melting temperature of 170° C.) and ABS (type ABS PA-757 provided by Qimei Corporation in Taiwan, having a weight average molecular weight of about 150,000) were dried in a drying oven under a pressure of 0.06 MPa, at an oven temperature of 85° C., for a time period of 4 h.

Poly (styrene-ethylene-butadiene-styrene) copolymer grafted with maleic anhydrides (type FG1901 provided by Kraton Performance Polymers Inc., located in the US, and maleic anhydrides having a weight content of 8 wt %) was placed in a vacuum drying oven, and dried under a pressure of 0.08 MPa, at a temperature of 40° C., for a time period of 4 h.

2. Mixing and Extrusion 100 weight parts of the polylactic acids (with a moisture content of 0.018 wt. %), 140 weight parts of ABS, and 8 weight parts of poly (styrene-ethylene-butadiene-styrene) copolymer grafted with maleic anhydrides, 1 weight part of tetra[β-(3,5-dit-butyl-4-hydroxy phenyl)propionic acid]pentaerythriotol (antioxidant 1010 provided by Nanjing Hua Lim Co., Ltd, located in China), 0.5 weight parts of diimine, and 40 weight parts of silicon-acrylic (s-2001 provided by Mitsubishi Chemical Holdings Corporation) were placed in a double screw extruder and mixed under the following conditions: a ratio of a screw length to screw diameter of 40, a screw rotation speed of 220 r/min, a vacuum degree of 0.06 MPa, and the extruder having ten temperature regions was set (from the inlet to the outlet) as follows: 140° C., 145° C., 145° C., 155° C., 165° C., 170° C., 175° C., 185° C., 190° C., and 195° C.

3. Staying, Granulating and Injection Molding

The extruded product was stayed by cooling in a water groove, and granulated in a granulator (type QLJ-1 commercially available from ZHANGJIAGANG LIANDA MACHINERY CO., LTD, location in China) at a rotation speed of 400 r/min, then dried and injection molded to form the polylactic acid material. The resulting polylactic acid material was labeled "A2."

EXAMPLE 3

1. Pretreatment of Raw Material

Polylactic acids (provided by Natureworks Corporation, located in the US, having a viscosity average molecular weight of 150,000 and a melting temperature of 175° C.) and ABS (type ABS PA-757 provided by Qimei Corporation, located in Taiwan, having a weight average molecular weight of about 200,000) were dried in a vacuum drying oven under a pressure of 0.04 MPa, at an oven temperature of 95° C., for a time period of 8 h.

ABS copolymer grafted with maleic anhydrides (type GPM-400A provided by Ningbo Nengzhiguang New Materials Technology Co., ltd., located in China, and maleic anhydrides having a weight content of 10 wt. %) was placed in a vacuum drying oven, and dried under a pressure of 0.04 MPa, at a temperature of 70° C., for a time period of 8 h.

2. Mixing and Extrusion 100 weight parts of the polylactic acids (with a moisture content of 0.01 wt. %), 130 weight parts of ABS, and 8 weight parts of ABS copolymer grafted with maleic anhydrides, 1.3 weight parts of butyl hydroxy anisd, 1.2 weight parts of oxazoline, and 45 weight parts of methyl methacrylate-ethyl acrylate-butyl acrylate copolymer were placed in a double screw extruder and mixed under the following conditions: a ratio of a screw length to screw diameter of 30, a screw rotation speed of 210 r/min, a vacuum degree of 0.05 MPa, and the extruder having ten temperature regions was set (from the inlet to the outlet) as follows: 145° C., 150° C., 150° C., 155° C., 165° C., 180° C., 185° C., 190° C., 195° C., and 200° C.

3. Staying, Granulating and Injection Molding

The extruded product was stayed by cooling in a water groove, and granulated in a granulator (type QLJ-1 commercially available from ZHANGJIAGANG LIANDA MACHINERY CO., LTD, located in China) at a rotation speed of 300 r/min, and then dried and injection molded to form the polylactic acid material. The resulting polylactic acid material was labeled "A3."

EXAMPLE 4

1. Pretreatment of Raw Material

Polylactic acids (type 3051D provided by Natureworks Corporation, located in the US, having a viscosity average molecular weight of 200,000 and a melting temperature of 170° C.) and ABS (ABS PA-747 provided by Qimei Corporation, located in Taiwan, having a weight average molecular weight of about 120,000) were dried in a drying oven under a pressure of 0.04 MPa, at an over temperature of 80° C., for a time period of 8 h.

Polystyrene grafted with maleic anhydrides (type 1501 provided by Sunny Corporation, located in Shanghai, China, and maleic anhydrides having a weight content of 6 wt. %) was placed in a vacuum drying oven, and dried under a pressure of 0.06 MPa, at a temperature of 70° C., for a time period of 4 h.

2. Mixing and Extrusion 100 weight parts of the polylactic acids (with a moisture content of 0.01 wt %), 150 weight parts of ABS, and 15 weight parts of ethylene-ethyl acrylate-glycidyl methacrylate copolymer, 1.8 weight parts of tetra[β-(3,5-dit-butyl-4-hydroxy phenyl) propionic acid]pentaerythriotol (antioxidant 1010 provided by Nanjing Hua Lim Co., Ltd, in China), 1.5 weight parts of diimide, 45 weight parts of silicon-acrylic (s-2001 provided by Mitsubishi Chemical Holdings Corporation) were placed in a double screw extruder and mixed under the following conditions: a ratio of a screw length to screw diameter of 30, a screw rotation speed of 210 r/min, a vacuum degree of 0.05 MPa, and the extruder having ten temperature regions was set (from the inlet to the outlet) as follows: 160° C., 175° C., 180° C., 185° C., 185° C., 190° C., 195° C., 195° C., 200° C., and 200° C.

3. Staying, Granulating and Injection Molding

The extruded product was stayed by cooling in a water groove, and granulated in a granulator (type QLJ-1 commercially available from ZHANGJIAGANG LIANDA MACHINERY CO., LTD, located in China) at a rotation speed of 400 r/min, then dried and injection molded to form the polylactic acid material. The resulting polylactic acid material was labeled "A4."

EXAMPLE 5

1. Pretreatment of Raw Material

Polylactic acids (type 3051D provided by Natureworks Corporation, located in the US, having a viscosity average molecular weight of 200,000 and a melting temperature of 170° C.) and ABS (ABS PA-757 provided by Qimei Corporation, located in Taiwan, having a weight average molecular weight of about 100,000) were dried in a drying oven under a pressure of 0.04 MPa, at an oven temperature of 95° C., for a time period of 8 h.

Ethylene-ethyl acrylate-glycidyl methacrylate (type AX8900 provided by Arkema Chemical Co., Ltd, wherein the glycidyl methacrylate had a weight content of 12 wt. %) was placed in a vacuum drying oven, and dried under a pressure of 0.04 MPa, at a temperature of 45° C., for a time period of 8 h.

2. Mixing and Extrusion 100 weight parts of the polylactic acids (with a moisture content of 0.01 wt. %), 170 weight parts of ABS, 20 weight parts of ethylene-ethyl acrylate-glycidyl methacrylate copolymer, 1.2 weight parts of tetra[β-(3,5-dit-butyl-4-hydroxy phenyl) propionic acid]pentaerythriotol (antioxidant 1010 provided by Nanjing Hua Lim Co., Ltd, in China), 1.6 weight parts of diimine, and 50 weight parts of silicon-acrylic (s-2001 provided by Mitsubishi Chemical Holdings Corporation) were mixed in a high speed mixer at a temperature of 60° C. for a time period of 5 min, then placed in a double screw extruder and mixed under the following conditions: a ratio of a screw length to screw diameter of 30, a screw rotation speed of 210 r/min, a vacuum degree of 0.05 MPa, and the extruder having ten temperature regions was set (from the inlet to the outlet) as follows: 160° C., 170° C., 175° C., 175° C., 180° C., 190° C., 190° C., 195° C., 195° C., and 200° C.

3. Staying, Granulating and Injection Molding

The extruded product was stayed by cooling in a water groove, and granulated in a granulator (type QLJ-1 commercially available from ZHANGJIAGANG LIANDA MACHINERY CO., LTD, located in China) at a rotation speed of 450 r/min, and then dried and injection molded to form the polylactic acid material. The resulting polylactic acid material was labeled "A5."

EXAMPLE 6

The process for preparing the polylactic acid composition and material was substantially the same as described in Embodiment 5, with the difference that a poly (styrene-ethylene-butadiene-styrene) copolymer grafted with maleic anhydrides (FG1901 provided by Kraton Polymers, located in US, within the weight content of maleic anhydrides was 8 wt. %) was applied instead of ethylene-ethyl acrylate-glycidyl methacrylate copolymer. The resulting polylactic acid material was labeled "A6."

Comparison Example 1

The process for preparing the polylactic acid composition and material was substantially the same as described in Example 5, with the difference being that the ethylene-ethyl acrylate-glycidyl methacrylate copolymer was not added during the preparing process. The resulting polylactic acid material was labeled "D1."

Comparison Example 2

The process for preparing the polylactic acid composition and material was substantially the same as described in Example 5, with the difference being that the ABS was not added during the preparing process. The resulting polylactic acid material was labeled "D2."

Comparison Example 3

The process for preparing the polylactic acid composition and material was substantially the same as described in Example 5, with the difference being that a polycaprolactone was applied instead of ethylene-ethyl acrylate-glycidyl methacrylate copolymer. The resulting polylactic acid material was labeled "D3."

Test

The samples A1-A6 and D1-D3 were tested in accordance with the following ASTM (American Society for Testing and Materials) procedures:

1. Tensile Strength and Break Elongation

The tensile strength and break elongation were tested according to ASTM D638.

2. Bending Strength and Flexural Modulus

The bending strength and flexural modulus were tested according to ASTM D790.

3. Notched Impact Strength

The notched impact strength was tested according to ASTM D256.

4. Heat Deformation Temperature

The heat deformation temperature was tested according to ASTM D648.

5. Melt Flow Rate

The melt flow rate was tested according to ASTM D1238.

The testing results were recorded in Table 1.

TABLE 1

| Sample | A1 | A2 | A3 | A4 | A5 | A6 | D1 | D2 | D3 |
|---|---|---|---|---|---|---|---|---|---|
| Tensile Strength/MPa | 30.24 | 43.2 | 41.67 | 42.68 | 45.35 | 44.16 | 40.2 | 38.4 | 38.7 |
| Break Elongation/% | 28 | 31 | 37 | 46 | 58 | 61 | 30 | 43 | 68 |
| Bending Strength/MPa | 43 | 48 | 51 | 57 | 65 | 62 | 68 | 78 | 66 |
| Flexural Modulus/MPa | 1564 | 1632 | 1713 | 2034 | 2231 | 2214 | 2246 | 3563 | 2234 |
| Notched Impact Strength/J/m | 46.5 | 52.3 | 88.7 | 95.2 | 101.1 | 96.4 | 49.6 | 32.6 | 86.2 |
| Heat Deformation Temperature (0.45 MPa)/°C. | 60.4 | 73.5 | 63.3 | 72 | 78 | 74 | 80.3 | 51.7 | 50.1 |
| Melt Flow Rate (210° C. 2.16 kg) g/10 min | 4.86 | 4.36 | 4.05 | 3.98 | 3.54 | 3.21 | 5.64 | 4.53 | 4.27 |

6. Hydrolysis Resistance Performance

Pure polylactic acids (PLA) (3051D commercially available from Natureworks) and samples A1-A6 and D1-D3 were tested to determine the hydrolysis resistance performances thereof.

The test was conducted by immersing most samples in water. The water temperature was 60° C. The samples were immersed for 0h (i.e., the sample was not immersed in water), 2 h, 4 h, 6 h, and 8 h. Then the samples were taken out and dried in a vacuum drying oven at a temperature of 60° C. for a time period of 24 h. Then the tensile strength of each sample was tested according to ASTM D638. The testing results were recorded in Table 2.

TABLE 2

| | Tensile Strength/Mpa | | | | |
|---|---|---|---|---|---|
| Sample | 0 h | 2 h | 4 h | 6 h | 8 h |
| PLA | 48 | 46.5 | 45.8 | 43.2 | 41.6 |
| A1 | 30.24 | 29.34 | 28.4 | 26.7 | 25.1 |
| A2 | 43.2 | 43.03 | 42.6 | 42.2 | 42.8 |
| A3 | 41.67 | 40.38 | 40.05 | 39.62 | 40.59 |
| A4 | 42.68 | 42.2 | 41.9 | 42.4 | 42.0 |
| A5 | 45.35 | 45.3 | 45.2 | 45.1 | 45.0 |
| A6 | 44.16 | 44.01 | 43.68 | 42.79 | 43.93 |
| D1 | 40.2 | 39.8 | 38.1 | 37.4 | 37.1 |
| D2 | 38.4 | 38.1 | 37.6 | 37.2 | 36.7 |
| D3 | 38.7 | 37.2 | 36.7 | 35.8 | 34.6 |

Without wishing to be bound by the same, Applicants believes that Table 1 illustrates that the polylactic acid material prepared by the polylactic acid composition had good mechanical performance and thermal resistance performance. Further, Applicants believe—without wishing to be bound thereby—that Table 2 illustrates that the polylactic acid material prepared by the polylactic acid composition had good hydrolysis resistance performance, and the use of ethylene-ethyl acrylate-glycidyl methacrylate as a compatibilizer improved both mechanical performance and shock resistance performance of the polylactic acid material.

Although explanatory embodiments have been shown and described, it would be appreciated by those skilled in the art that changes, alternatives, and modifications all falling into the scope of the claims and their equivalents may be made in the embodiments without departing from spirit and principles of the present disclosure.

What is claimed is:

1. A method of preparing a polylactic acid material comprising the steps of:
melting and extruding the polylactic acid composition at a temperature ranging from about 140° C. to about 200° C. to form an extruded polylactic acid composition, the polyactic acid material comprising a polymer matrix and a compatibilizer,
wherein the polymer matrix includes at least one polylactic acid and at least one acrylonitrile-butadiene-styrene;
wherein the compatibilizer is at least one compound selected from the group consisting of:
a poly (styrene-ethylene-butadiene-styrene) copolymer grafted with maleic anhydrides;
an acrylonitrile-butadiene-styrene copolymer grafted with maleic anhydrides;
a polystyrene grafted with maleic anhydrides; and
an ethylene-ethyl acrylate-glycidyl methacrylate;
and then granulating and injection molding the extruded polylactic acid composition to form the polylactic acid material; and
drying the polylactic acid material under a pressure ranging from about 0.04 MPa to about 0.08 MPa at a temperature ranging from about 30° C. to about 95° C.; then melting and extruding the polylactic acid material using a screw having a ratio of length to diameter ranging from about 20 to about 40, the screw having a rotating speed ranging from about 180 to about 230 r/min and under a temperature zone selected from the group consisting of: about 140° C. to about 160° C., about 140° C. to about 170° C., about 140° C. to about 180° C., about 150° C. to about 180° C., about 160° C. to about 180° C., about 170° C. to about 190° C., about 180° C. to about 195° C., about 180° C. to about 195° C., about 190° C. to about 200° C., about 195° C. to about 200° C., and each temperature zone operated under a vacuum degree ranging from about 0.02 MPa to about 0.06 MPa.

2. A method of claim 1, wherein the acylonitrile-butadiene-styrene ranges from about 91 wt. % to about 171 wt. % of the polylactic acid, and the compatibilizer ranges from about 10 wt. % to about 22.2 wt. % of the polylactic acid, based on the total weight of the polylactic acid.

3. A method of claim 1, wherein the polylactic acid composition has a viscometric average molecular weight ranging from about 100,000 to about 750,000, a melting temperature ranging from about 150° C. to about 175° C., and a moisture content of less than about 0.025 wt. %.

4. A method of claim 1, wherein the acrylonitrile-butadiene-styrene has a weight average molecular weight ranging from about 50,000 to about 150,000.

5. A method of claim 1, wherein the compatibilizer is at least one compound selected from the group consisting of:
a poly (styrene-ethylene-butadiene-styrene) copolymer grafted with maleic anhydrides,
wherein the maleic anhydrides range from about 3 wt. % to about 10 wt. % of the poly (styrene-ethylene-butadiene-styrene) copolymer grafted with maleic anhydrides;
an acrylonitrile-butadiene-styrene copolymer grafted with maleic anhydrides,
wherein the maleic anhydrides range from about 3 wt. % to about 10 wt. % of the acrylonitrile-butadiene-styrene copolymer grafted with maleic anhydrides;
a polystyrene grafted with maleic anhydrides,
wherein the maleic anhydrides range from about 3 wt. % to about 10 wt. % of the polystyrene grafted with maleic anhydrides; and
an ethylene-ethyl acrylate-glycidyl methacrylate.

6. A method of claim 2, wherein the compatibilizer is ethylene-ethyl acrylate-glycidyl methacrylate.

7. A method of claim 6, wherein the glycidyl methacrylate ranges from about 6 wt. % to about 15 wt. % of the ethylene-ethyl acrylate-glycidyl methacrylate.

8. A method of claim 1, wherein the polylactic acid composition further comprises at least one additive selected from the group consisting of: an antioxidant in an amount ranging from about 0.3 wt. % to about 2 wt. % of the polylactic acids, a hydrolysis resistance agent in an amount ranging from about 0.2 wt. % to about 1.68 wt. % of the polylactic acids, and a shock resistance agent in an amount ranging from about 6.8 wt. % to about 50 wt. % of the polylactic acids.

9. A method of claim 8, wherein the antioxidant is at least one selected compound from the group consisting of: a butyl hydroxy anisd, a dibutyl hydroxyl toluene, a tert-butylhydroquinone, a phenyl diisodecyl phosphate, a pentaerythritol diphosphite, [3-(3,5-dit-butyl-4-hydroxyphenyl) propionic acid]pentaerythriotol, a tri-(2,4-dit-butyl phenyl)phosphate, [β-(3,5-dit-butyl-4-hydroxy phenyl)propionic acid] octadecanoate, tetra[β-(3,5-dit-butyl-4-hydroxy phenyl)propionic acid]pentaerythriotol; the hydrolysis resistance agent is at least one compound selected from the group consisting of: a carbodiimide compound, a isocyanate compound, and a oxazoline compound; and the shock resistance agent is at least one compound selected from the group consisting of: a silicon-acrylic resin, and a methyl methacrylate-ethyl acrylate-butyl acrylate copolymer.

* * * * *